May 11, 1965 ALUBINUS JUNPEI OHNAKA 3,182,577
MEANS FOR SWINGING AND TILTING THE FILM
FACE AS WELL AS THE FOCUS MAT SCREEN
FACE OF REFLEX CAMERA
Filed Sept. 27, 1962 2 Sheets-Sheet 1
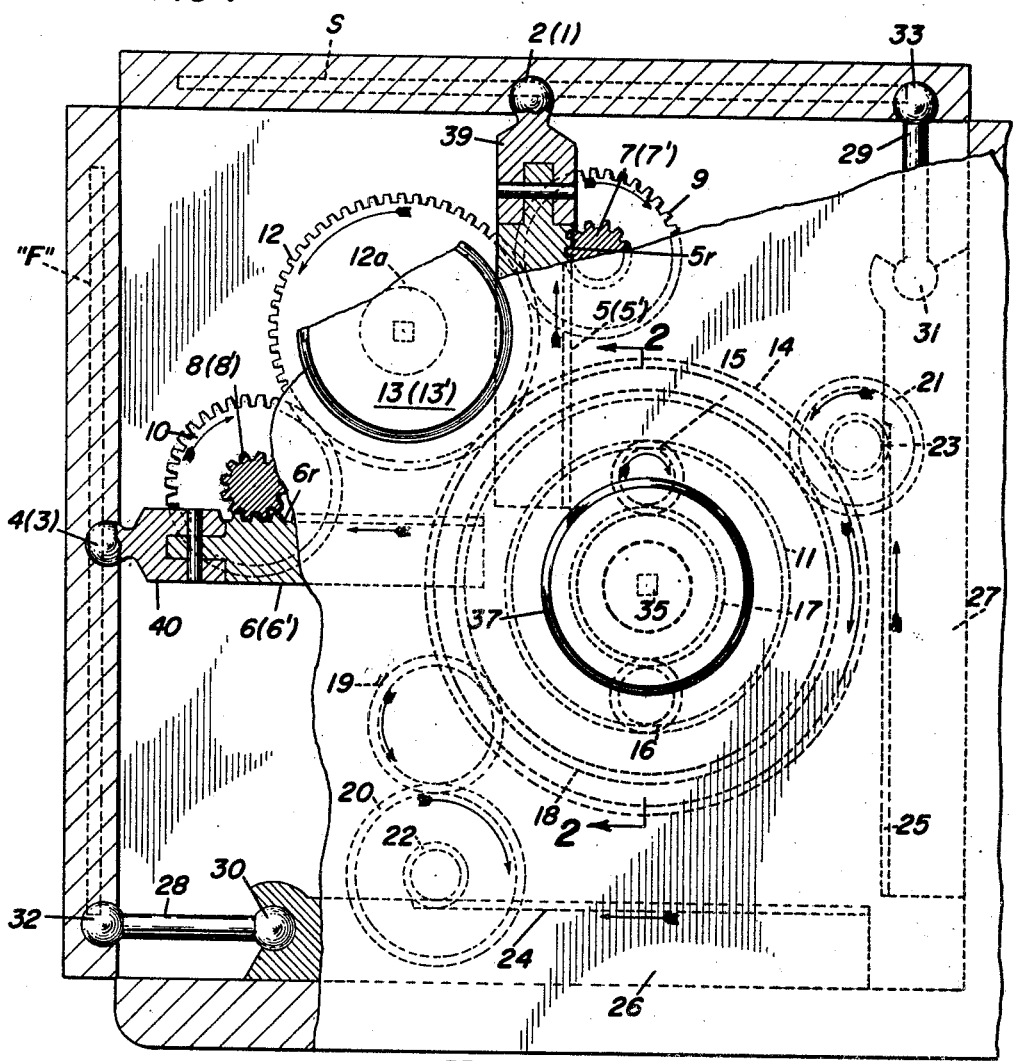
FIG 1
FIG 2
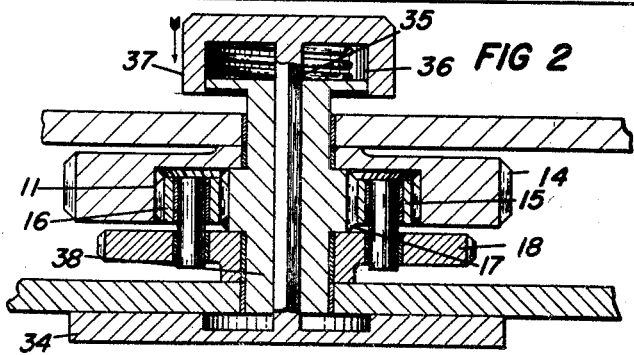
ALUBINUS J. OHNAKA
INVENTOR
BY *Wenderoth, Lind*
 *& Ponack*
ATTORNEYS

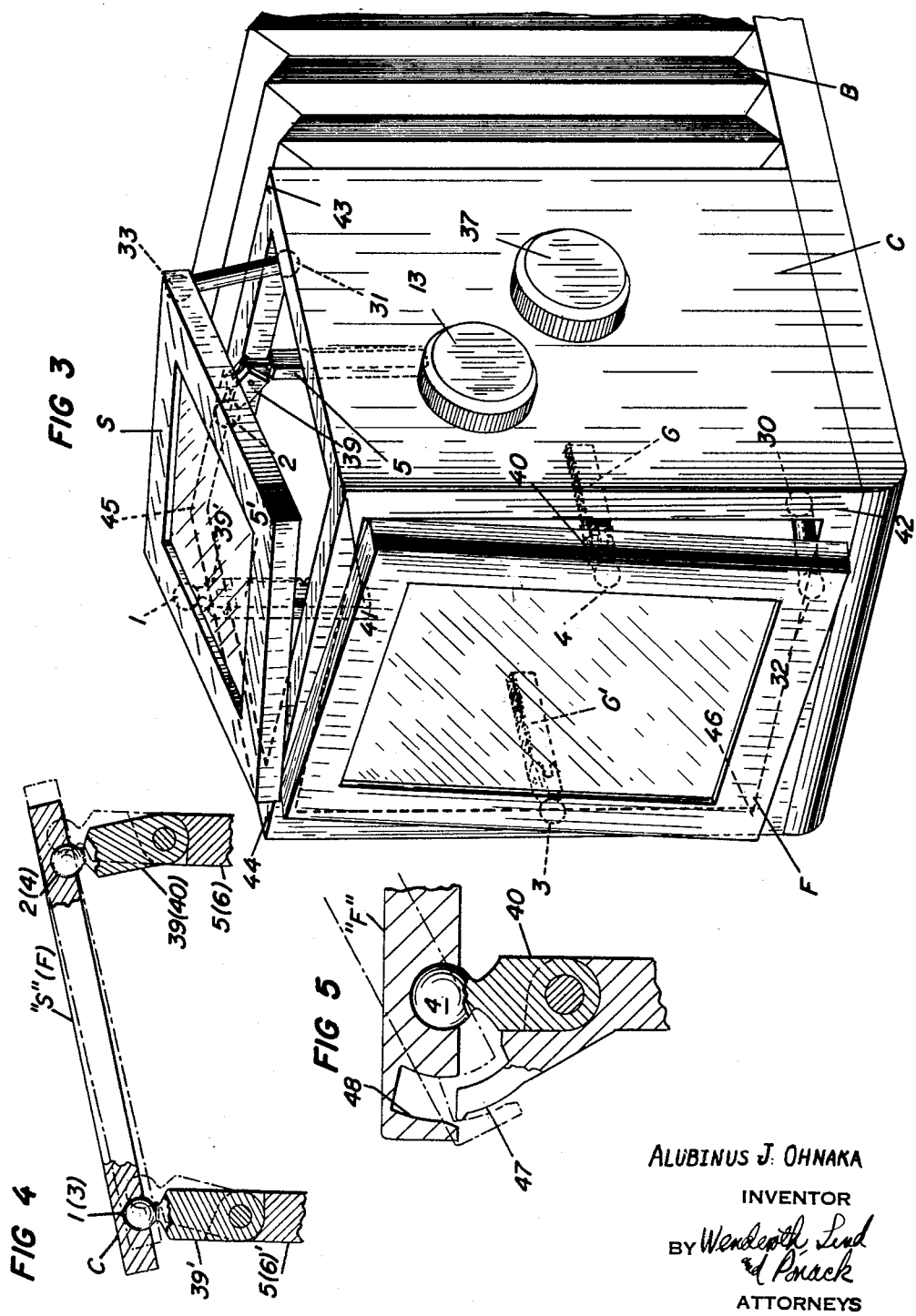

United States Patent Office 3,182,577
Patented May 11, 1965

3,182,577
MEANS FOR SWINGING AND TILTING THE FILM FACE AS WELL AS THE FOCUS MAT SCREEN FACE OF REFLEX CAMERA
Alubinus Junpei Ohnaka, 1165—1 Mukaiichiba-machi, Kurashiki, Japan
Filed Sept. 27, 1962, Ser. No. 226,575
Claims priority, application Japan, Oct. 3, 1961, 36/36,310
6 Claims. (Cl. 95—50)

The present invention relates to a single lens reflex or view camera which has a swingable and tiltable film holder and a swingable and tiltable focusing screen of ground glass or the like, and more particularly to such cameras in which means are provided for simultaneously swinging and tilting both the film holder and the focusing screen to the same extent.

It is often necessary in taking pictures with reflex cameras or view cameras to swing and tilt the film holder so as to place the film at a slight angle to the axis of the lens. When a focusing screen is used, the focusing screen must be swung and tilted a corresponding amount so that the image seen on the focusing screen is the same as that which will be projected on the film when the film is exposed.

It is an object of the present invention to provide an improved means for simultaneously swinging and tilting both the film holder and the focusing screen in which when the film holder and focusing screen are swung, the tilting means is automatically moved to compensate for the swinging, and when the film holder and focusing screen are tilted, the swinging means does not move.

Other and further objects of the present invention will become apparent from the following specification and claims, taken together with the accompanying drawings, in which:

FIG. 1 is a side elevation view, partly in section, of a camera according to the present invention;
FIG. 2 is a sectional view taken on line 2—2 of FIG. 1;
FIG. 3 is a perspective view of the camera of FIG. 1;
FIG. 4 is a sectional elevation view, on an enlarged scale, of the focusing screen illustrating how the bearing supports can move too far to distort the member being swung; and
FIG. 5 is a sectional view, on an enlarged scale, of a detail of a bearing joint.

As seen in FIG. 3, the camera comprises a box C having a bellows B on the front end thereof in which the lens, which is not visible in this view, is positioned. The box C has a film holder F on the back side thereof which is mounted for swinging movement for changing the angle of the film holder relative to the edge 41–44 of the box and for tilting movement about the central axis of the film holder. The box further has a focusing screen S on the top thereof which is mounted for swinging movement for changing the angle relative to the edge 41–44 of the box and for tilting movement about the central axis of the focusing screen. It will thus be seen that when the film holder and the focusing screen are swung an equal amount, the various points on the film holder and the focusing screen will move equal distances away from a diagonal plane through the edge 41–44 of the box, while when the film holder and focusing screen are tilted an equal amount, the various points thereon will also be moved equal distances away from such a plane.

The means for swinging the focusing screen S comprise two slides 5 and 5' on opposite sides of the box, said slides sliding in vertical grooves in the sides of the box. Hinged to the ends of the slides 5 and 5' are short links 39 and 39' respectively on the ends of which are balls 1 and 2 which fit into sockets in the middle of the sides of frame S. The balls 1 and 2 and the sockets in which they rotate form universal joints between the links and the frame S.

The means for swinging the film holder F comprise two slides 6 and 6' on opposite sides of the box, said slides sliding in horizontal grooves in the sides of the box. Hinged to the ends of said slides 6 and 6' are short links 40 and 40' respectively on the ends of which are balls 3 and 4 which fit into sockets in the middle of the sides of the film holder F. The balls 3 and 4 and the sockets in which they rotate form universal joints between the links and the film holder F.

On the sides of the slides 5 and 5' and 6 and 6' are racks 5r and 6r respectively, and pinions 7 and 7' and 8 and 8' are engaged with the respective racks 5r and 6r. Considering only the end of the camera shown in FIG. 1, fixed on the shafts of the pinions 7 and 8 are gears 9 and 10 which in turn mesh with a gear 12 which lies between the gears 9 and 10. Gear 12 is mounted on a shaft 12a which extends through the side of the camera and has knob 13 fixed on the end thereof. Together with an identical mechanism at the other side of the box C, rotation of the knob 13 and the corresponding knob on the other side of the box C moves both the slides 5 and 6 and 5' and 6' and swings both the focusing frame and the film holder at the same time and to the same extent.

The means for tilting the focusing frame S and the film holder F are contained only in one end of the camera, the end shown in FIG. 1. It comprises a vertical slide 27 at the front of the box C and a horizontal slide 26 at the bottom of the box C, each of which has a rack thereon on the edge which faces toward the central part of the side of the box and each of which has a socket at the upper and rear end thereof respectively. In the socket on the horizontal slide 26 is a ball 30 on the end of a connecting rod 28, on the other end of which is a ball 32 fitted into a socket in the corner of the film holder F. The connecting rod and balls form a universal joint between the film holder F and the slide 26. In the socket on the end of the vertical slide 27 is a ball 31 on the end of a connecting rod 29, on the other end of which is a ball 33 fitted into a socket in the corner of the focusing screen F. The last mentioned connecting rod and balls form a universal joint between the vertical slide 27 and the focusing screen F. Meshed with the racks on the slides 26 and 27 are pinions 22 and 23, and on the shafts of the pinions 22 and 23 are gears 20 and 21. Gear 21 meshes directly with a large gear 18, forming part of a differential mechanism while an idler gear 19 is positioned between the gear 20 and the gear 18. As seen in FIG. 2, the gear 18 is rotatably mounted on shaft 38 which in turn is keyed to the shaft 35 which extends out through the side of the box C and has tilting drive knob 37 thereon. The shaft 35 has friction disc 34 on the other end thereof, disc 34 frictionally engaging the inside wall of the box C. The shaft 35 is also slidable in the shaft 38 and is kept urged in the outward direction relative to the box wall by the spring 36 between the knob 37 and the end of shaft 38.

Sun gear 17 forms an integral part of hollow shaft 38, and it meshes with planet gears 15 which are rotatably mounted on the gear 18. Also rotatably mounted on shaft 38 is gear 14 which has internal teeth thereon meshing with the planet gears and which has the external teeth thereon meshing with the teeth on gear 12.

It will be appreciated that in the normal position, the friction disc 34 will engage the inside wall of the box C and prevent the knob 37 and the shafts 35 and 38 from rotating. This prevents unintentional rotation of the gearing causing tilting as well as a further function to be explained below. However, it will be possible to use a similar shaft and friction disc arrangement on the shafts for the knobs 13 but without the differential mechanism having sun, planet and internal gears in order to lock the knobs 13 against accidental displacement.

In order to swing the focusing screen S and the film holder F, the knobs 13 on opposite sides of the box C are rotated counterclockwise. This in turn rotates the gears 12 counterclockwise, the gears 9 and 10 and pinions 7 and 8 clockwise, as indicated by the arrows in FIG. 1, and this in turn causes the slides 5 and 5' to move upwardly and the slides 6 and 6' to move rearwardly. The focusing screen S will then swing so as to assume an angle relative to edge 41–44 with the balls 1 and 2 turning in the sockets and the links 39 and 39' turning slightly inwardly, and film holder F will assume a like angle with respect to the same edge. At the same time, the gear 12 turns the gear 14 clockwise, and the teeth 11 rotate the planetary gears 15 and 16. Since, however, the shaft 38 and the sun gear 17 are braked by the spring 36 and the disc 34, the planetary gears run around sun gear 17 clockwise and rotate gear 18 clockwise. Gears 19, 20 and 21 then rotate so as to rotate pinion 23 counterclockwise and pinion 22 clockwise, thereby sliding the slide 26 to the rear in the direction of the arrow and sliding the slide 27 upwardly in the direction of the arrow. Thus the connecting rods 28 and 29 respectively move the lower right corner of the film holder F and the upper right corner of the focusing screen outwardly at the same speed and parallel to the balls 4 and 2 and the links 39 and 40. When the swinging motion has been carried out to the desired extent, the knobs 13 are released, and when they have the friction disc locking means on them, they will be held in the desired position.

In order to tilt the focusing screen S and the film holder F, the knob 37, of the differential mechanism of which there is only one, is rotated clockwise, after it has been pushed into space friction disc 34 from the inside wall of the box C. This rotates sun gear 17 because hollow shaft 38 is keyed to the shaft 35. However, with knob 13 braked, gear 12 brakes gear 14, so that planetary gears 15 and 16 run around the inside of the gear 14 on the fixed teeth 11. This causes gear 18 to turn clockwise, thereby turning gears 19, 20 and 21 which in turn rotates pinions 22 and 23 in directions to cause slides 26 and 27 to slide outwardly. The connecting rod 28 will thus tilt the film holder F about an axis between balls 3 and 4, while the connecting rod 29 will tilt the focusing screen S about an axis between balls 1 and 2. It will be appreciated that this tilting can only be continued until the corners of the film holder F and focusing screen S touch the corner 44 of the box C or the edges of the film holder and focusing screen touch the edge 41–44 of the box C. When the desired tilting has been accomplished, the knob 37 is released and the focusing screen and film holder are held in position.

It will be seen that by rotating the knob 37 in the other direction, i.e. in the counterclockwise direction, the film holder and focusing screen can be tilted in the opposite directions from that shown in FIG. 3.

In a view camera in which it is desired to keep the center of the film holder and the focusing screen at the same position all the time, the above described apparatus can be modified to place the rack on either of the swinging slides 5 and 5' or 6 and 6' on the other side of the slide, so that one of the sets of slides, either 5 and 6 or 5' and 6' will move outwardly while the other set moves inwardly. Thus one side of the film holder, for instance, will move toward the edge of the box C, while the other will move away from the edge of the box C. The corresponding edges of the focusing frame will move the same way. Since the tilting mechanism tilts the focusing screen and the film holder about axes through the centers thereof, this mechanism can remain the same.

It is also desirable to provide some means for making sure that the swinging means on one side of the box C is not operated so far that it distorts the film holder and the focusing screen. If the knob 13 on one side is rotated too far in one direction without a corresponding rotation of the knob 13 on the other side, the condition shown in FIG. 4 will occur, in which the member S or F is distorted because the knob 1 or 3 is moved to far inwardly. To prevent such distortion from occurring, a safety device such as shown in FIG. 5 can be provided. This comprises a finger 47 on the side of the box C adjacent the links 39, 39' and 40 and 40' and corresponding holes 48 on the focusing screen S and the film holder F. As the member F or S is swung, the finger 47 enters or is withdrawn from the hole 48, and when the relative movement between the link and the member has reached the desired limit, the finger 47 will bear against the side of the hole 48 and prevent further relative movement.

It is thought that the invention and its advantages will be understood from the foregoing description and it is apparent that various changes may be made in the form, construction and arrangement of the parts without departing from the spirit and scope of the invention or sacrificing its material advantages, the forms hereinbefore described and illustrated in the drawings being merely preferred embodiments thereof.

What is claimed is:

1. A camera having a hollow box with a film holder on one side thereof and a focusing screen on the other side thereof, swinging slide means in said box and connected to opposite sides of said film holder and said focusing screen for swinging said film holder and said focusing screen, swinging drive means in said box and connected to said swinging slide means for simultaneously driving the swinging slide means for both the film holder and focusing screen, tilting slide means connected to corresponding sides of said film holder and focusing screen for tilting said film holder and focusing screen about an axis between the swinging slide means, tilting drive means for said tilting slide means connected to said tilting slide means, and a differential mechanism having a tilting drive knob and coupled to said tilting drive means and swinging drive means for driving said tilting drive means when said swinging drive means is actuated and for driving only said tilting slide means when said tilting drive knob is actuated.

2. A camera having a hollow box with a film holder on one side thereof and a focusing screen on the other side thereof, a pair of film holder swinging slides, one on each side of said box and swively connected to opposite sides of said film holder substantially midway of the sides of the film holder, a pair of focusing screen swinging slides, one on each side of the box and adjacent the film holder swinging slides and swively connected to opposite sides of the focusing screen substantially midway of the sides of the focusing screen, a plurality of swinging gear drive means, one on each side of said box, geared to said swinging slides for simultaneously driving said swinging slides for both the film holder and the focusing screen for swinging said film holder and focusing screen so that corresponding portions thereof move equal distances in the same directions from a diagonal plane through said box from the edge of said box between said film holder and focusing screen, a pair of tilting slides on one end of said box, one swively connected to one corner of said focusing screen and the other swively connected to one corner of said film holder, tilting gear drive means geared to said tilting slides, a differential gear mechanism having a tilting drive knob and brake means included in said differential gear mechanism, and said swinging gear drive means being geared to said differential mechanism and said differential mechanism being geared to said tilting gear drive means for driving said tilting slides when said swinging gear drive means is actuated and for driving only said tilting slides when said tilting drive knob is actuated.

3. A camera as claimed in claim 2 in which said differential mechanism comprises a gear having internal and external teeth, a pair of planet gears running on the internal teeth of said gear on which said planet gears are rotatably mounted, having a sun gear on which said planet gears run, said swinging gear drive means being meshed with the external teeth of said gear, and said tilting drive knob being connected to said sun gear.

4. A camera as claimed in claim 2 in which said brake means comprise a friction disc bearing against the inside of said box, said tilting drive knob having a central shaft connected thereto on which said friction disc is mounted, said knob being on the other end of said central shaft, a hollow shaft around said central shaft and keyed thereto, and a spring means between said knob and hollow shaft urging them apart and urging said friction disc against the wall of said box.

5. A camera as claimed in claim 2 in which said swinging gear drive means each have braking means as a part thereof for holding said swinging gear drive means when they are not being actuated.

6. A camera as claimed in claim 2 in which said swinging slides have a plurality of fingers extending outwardly and upwardly toward said film holder and focusing screen, said film holder and focusing screen each having holes therein into which said fingers extend for preventing relative movement between said slides and said film holder and focusing screen beyond a predetermined amount.

References Cited by the Examiner
UNITED STATES PATENTS
2,539,499   1/51   Walters _____ 95—42

NORTON ANSHER, *Primary Examiner.*
J. M. HORAN, *Examiner.*